(12) United States Patent
Lyu et al.

(10) Patent No.: US 12,666,447 B2
(45) Date of Patent: Jun. 23, 2026

(54) METHOD FOR COMMUNICATION AND TERMINAL DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/671,651

(22) Filed: May 22, 2024

(65) Prior Publication Data

US 2025/0317942 A1    Oct. 9, 2025

Related U.S. Application Data

(63) Continuation of application No. PCT/CN2023/077975, filed on Feb. 23, 2023.

(51) Int. Cl.
| | |
|---|---|
| *H04W 72/25* | (2023.01) |
| *H04B 17/318* | (2015.01) |
| *H04L 5/00* | (2006.01) |

(52) U.S. Cl.
CPC .......... *H04W 72/25* (2023.01); *H04B 17/328* (2023.05); *H04L 5/0094* (2013.01)

(58) Field of Classification Search
USPC .... 370/229, 230, 230.1, 236, 252, 328, 329, 370/330, 341
See application file for complete search history.

(56) References Cited

U.S. PATENT DOCUMENTS

| | | | | |
|---|---|---|---|---|
| 2016/0255639 A1* | 9/2016 | Chen | .................. | H04W 72/542 |
| | | | | 370/336 |
| 2021/0360590 A1* | 11/2021 | Lee | .................. | H04W 72/0453 |
| 2022/0086700 A1* | 3/2022 | Nguyen | ............... | H04W 24/10 |

(Continued)

FOREIGN PATENT DOCUMENTS

| | | |
|---|---|---|
| CN | 110800242 | 2/2020 |
| CN | 112970304 | 6/2021 |
| CN | 114788369 | 7/2022 |

(Continued)

OTHER PUBLICATIONS

International Search Report and Written Opinion in International Appln. No. PCT/CN2023/077975, mailed on Nov. 14, 2023, 15 pages (with English machine translation).

(Continued)

*Primary Examiner* — Nguyen H Ngo
(74) *Attorney, Agent, or Firm* — Fish & Richardson P.C.

(57) ABSTRACT

Disclosed are a method for communication and a terminal device. One example method includes: acquiring, by a terminal device, first information of a first radio access technology (RAT), wherein the first information indicates information related to a first resources of the first RAT, and each of the first RAT and a second RAT is an RAT used to transmit a sidelink, and wherein the first information is acquired within T milliseconds prior to a slot n, wherein the slot n is used to transmit on at least one of a physical sidelink shared channel (PSSCH) or a physical sidelink control channel (PSCCH) by using the second RAT based on the first information, wherein T is an integer.

20 Claims, 4 Drawing Sheets

The second RAT acquires first information of the first RAT

S310

(56) References Cited

U.S. PATENT DOCUMENTS

2022/0417988 A1* 12/2022 Wang .................. H04W 72/25
2023/0224926 A1* 7/2023 Sarkis ................. H04W 72/11
                                                                 370/329

FOREIGN PATENT DOCUMENTS

CN         115516972     12/2022
CN         115580932      1/2023

OTHER PUBLICATIONS

3GPP TSG RAN WG1 #111, Nov. 14-18, 2022, 3rd Generation Partnership Project Technical Specification Group Radio Access Network, "Discussion on co-channel coexistence for LTE sidelink and NR sidelink," (R1-2211200), CATT, GOHIGH, 17 pages.
3GPP TSG RAN WG1 #112, Feb. 27-Mar. 3, 2023, 3rd Generation Partnership Project Technical Specification Group Radio Access Network, "Discussion on co-channel Coexistence for LTE Sidelink and NR Sidelink," (R1-2301348), Apple, 8 pages.
Extended European Search Report in European Appln. No. 23923356.2-1206, mailed on Mar. 23, 2026, 15 pages.

* cited by examiner

The second RAT acquires first information of the first RAT — S310

METHOD FOR COMMUNICATION AND TERMINAL DEVICE

CROSS-REFERENCE TO RELATED APPLICATIONS

This application is a continuation of International Application No. PCT/CN2023/077975, filed on Feb. 23, 2023, the disclosure of which is hereby incorporated by reference in its entirety.

TECHNICAL FIELD

The present disclosure relates to the technical field of communications, and more particularly, to a method for communication and a terminal device.

BACKGROUND

Market penetration of sidelink communication systems may increase over time, but different sidelink (SL)-based radio access technologies (RATs) may need to coexist in a co-channel scenario, i.e., different RATs may coexist on the same frequency channel. For example, long term evolution (LTE) SL and new radio (NR) SL may exist in the same terminal device, and then LTE SL and NR SL need to coexist in a co-channel scenario. In the case where multiple SL-based RATs are included in the terminal device, interference may occur between the multiple RATs.

SUMMARY

Embodiments of the present disclosure provide a terminal device and a network device. Various aspects of the present disclosure are described below.

In a first aspect, a method for communication is provided. The method is applicable to a terminal device including a first radio access technology (RAT) and a second RAT. The method includes: acquiring, by the second RAT, first information of the first RAT, where the first information is configured to indicate information related to first resources of the first RAT, and each of the first RAT and the second RAT is an RAT based on a sidelink.

In some embodiments, the information related to the first resources includes sensing information and/or resource information.

In some embodiments, the resource information includes one or more of following information of the first RAT: information related to reserved resources of the terminal device; information related to reserved resources determined by decoding sidelink control information (SCI); sub-channel configuration information; a candidate resource set; information related to logical sub-frames; priority information; or information related transmission resources.

In some embodiments, the sensing information is configured to indicate a sensing result, the sensing result includes one or more of the following parameters obtained by sensing a signal and/or a channel of the first RAT: reference signal received power (RSRP), reference signal received quality (RSRQ), and received signal strength indicator (RSSI).

In some embodiments, the method further includes: transmitting, by the second RAT, a first request message; and acquiring, by the second RAT, the first information shared by the first RAT includes: receiving, by the second RAT, the first information in response to transmitting the first request message.

In some embodiments, the method further includes sharing, by the first RAT, the first information based on one or more of time, message and pre-configuration.

In some embodiments, acquiring, by the second RAT, the first information shared by the first RAT includes one or more of: periodically acquiring, by the second RAT, the first information shared by the first RAT; acquiring, by the second RAT, the first information shared by the first RAT in response to a traffic trigger condition of the second RAT; or acquiring, by the second RAT, the first information shared by the first RAT in response to a sensing result of the first RAT being less than or equal to a first threshold.

In some embodiments, the first threshold is preset and/or configured by a higher layer.

In some embodiments, the method further includes: in a slot n, providing, by the second RAT, a high-layer parameter for transmission over a physical sidelink shared channel (PSSCH) and/or a physical sidelink control channel (PSCCH); and acquiring, by the second RAT, the first information of the first RAT includes: acquiring, by the second RAT, the first information within T milliseconds prior to the slot n, and determining transmission resources of the second RAT based on the first information; or acquiring, by the second RAT, the first information within a first time window, and determining transmission resources of the second RAT based on the first information, where T is less than or equal to $T_{max}$, $T_{max}$ being a positive integer.

In some embodiments, the first information is configured to indicate transmission resources required by the first RAT in shared transmission resources, where the shared transmission resources are shared by the first RAT and the second RAT.

In some embodiments, a proportion of the transmission resources required by the first RAT in the shared transmission resources is configured or predefined.

In some embodiments, the method further includes one or more of: in response to the first RAT and the second RAT both needing to use the shared transmission resources, preferentially allocating resources to a RAT having a greater sensing result; in response to a target RAT of the first RAT and the second RAT needing to use the shared transmission resources, allocating a part of the shared transmission resources to the target RAT; or in response to a target RAT of the first RAT and the second RAT needing to use the shared transmission resources, reserving a part of the shared transmission resources to an RAT other than the target RAT.

In some embodiments, the transmission resources required by the first RAT are determined by a channel busy ratio (CBR), where a CBR corresponding to a sub-frame n satisfies:

$$CBR_n = k1 * \frac{\sum_{i=1}^{M} Q_{n-i}}{M} + k2 * Q_{n-1} + k3 * (Q_{n-1} - Q_{n-2}),$$

where k1, k2, and k3 are each a number greater than 0 and less than 1, M represents a number of sub-frames for determining the $CBR_n$, and Q represents a sensing result of a corresponding sub-frame.

In some embodiments, the transmission resources required by the first RAT are determined by channel resources (CRs), where the CRs are determined based on a CBR, and the CRs are configured to determine a size of transmission resources required by the first RAT and/or the second RAT2 in the shared transmission resources.

In some embodiments, the method further includes one or more of: preferentially allocating and/or assigning resources in the shared transmission resources to a RAT with a higher RAT priority; preferentially allocating and/or assigning resources in the shared transmission resources to traffic with a higher traffic priority; or preferentially allocating and/or assigning resources in the shared transmission resources to a RAT with a physical sidelink feedback channel (PSFCH).

In some embodiments, resources required by the second RAT include transmission resources required by the PSFCH, where a period of the transmission resources required by the PSFCH is P times a period of the transmission resources required by the first RAT, P being a positive integer.

In some embodiments, the transmission resources required by the PSFCH include a slot where the PSFCH is located. The slot where the PSFCH is located is related to a reference slot, and the reference slot is a start slot of the second RAT in the shared transmission resources.

In some embodiments, the slot where the PSFCH is located satisfies: n+

$$Q * P_{rsvp\_nrTX} * N_{PSSCH}^{PSFCH} - 1,$$

where n represents a location of the reference slot, Q represents a scaling factor and is a positive number, $P_{rsvp\_nrTX}$ represents the period of the transmission resources required by the PSFCH, and $$N_{PSSCH}^{PSFCH}$$

represents that one out of every $$N_{PSSCH}^{PSFCH}$$

slots is a PSFCH.

In some embodiments, in response to a sensing result of the second RAT being greater than or equal to a detection threshold, R is an integer greater than or equal to 2.

In some embodiments, the detection threshold is preset and/or set by a higher layer of the second RAT.

In some embodiments, resources required by the second RAT include transmission resources required by the PSFCH, where locations of the transmission resources required by the PSFCH in the shared transmission resources are pre-configured.

In some embodiments, resources required by the second RAT include transmission resources required by the PSFCH, and transmission over the PSFCH is prohibited in the shared transmission resources.

In a second aspect, a terminal device is provided. The terminal device includes: a first radio access technology (RAT) and a second RAT. The terminal device further includes an acquiring unit configured to acquire, by the second RAT, first information shared by the first RAT, where the first information is configured to indicate information related to first resources of the first RAT, and each of the first RAT and the second RAT is an RAT based on a sidelink.

In some embodiments, the information related to the first resources includes sensing information and/or resource information.

In some embodiments, the resource information includes one or more of the following information of the first RAT: information related to reserved resources of the terminal device; information related to reserved resources determined by decoding sidelink control information SCI; sub-channel configuration information; a candidate resource set; information related to a logical sub-frame; priority information; or information related to transmission resources.

In some embodiments, the sensing information is configured to indicate a sensing result, where the sensing result includes one or more of the following parameters obtained by sensing a signal and/or a channel of the first RAT: reference signal received power (RSRP), reference signal received quality (RSRQ), and received signal strength indicator (RSSI).

In some embodiments, the terminal device further includes a transmitting unit configured to transmit, by the second RAT, a first request message, and the acquiring unit is configured to receive, by the second RAT, the first information in response to transmitting the first request message.

In some embodiments, the terminal device further includes a sharing unit. The sharing unit is configured to share, by the first RAT, the first information based on one or more of time, message and pre-configuration.

In some embodiments, the acquiring unit is configured to perform one or more of: periodically acquiring, by the second RAT, the first information shared by the first RAT; acquiring, by the second RAT, the first information shared by the first RAT in response to a traffic trigger condition of the second RAT; or acquiring, by the second RAT, the first information shared by the first RAT in response to a sensing result of the first RAT being less than or equal to a first threshold.

In some embodiments, the first threshold is predefined and/or configured by a higher layer.

In some embodiments, the terminal device is further configured to: in a slot n, provide a high-layer parameter for transmission over a physical sidelink shared channel (PSSCH) and/or a physical sidelink control channel (PSCCH); and the acquiring unit is configured to: acquire, by the second RAT, the first information within T milliseconds prior to the slot n, and determine transmission resources of the second RAT based on the first information; or acquire, by the second RAT, the first information within a first time window, and determine transmission resources of the second RAT based on the first information, where T is less than or equal to $T_{max}$, $T_{max}$ being a positive integer.

In some embodiments, the first information indicates transmission resources required by the first RAT in shared transmission resources, where the shared transmission resources are shared by the first RAT and the second RAT.

In some embodiments, a proportion of the transmission resources required by the first RAT in the shared transmission resources is configured or predefined.

In some embodiments, the terminal device is further configured to perform one or more of: in response to the first RAT and the second RAT both needing to use the shared transmission resources, preferentially allocating resources to a RAT having a greater sensing result; in response to a target RAT of the first RAT and the second RAT needing to use the shared transmission resources, allocating a part of the shared transmission resources to the target RAT; or in response to a target RAT of the first RAT and the second RAT needing to use the shared transmission resources, reserving a part of the shared transmission resources to an RAT other than the target RAT.

In some embodiments, the transmission resources required by the first RAT are determined by a channel busy ratio (CBR), where a CBR corresponding to a sub-frame n satisfies:

$$CBR_n = k1 * \frac{\sum_{i=1}^{M} Q_{n-i}}{M} + k2 * Q_{n-1} + k3 * (Q_{n-1} - Q_{n-2}),$$

where k1, k2, and k3 are each a number greater than 0 and less than 1, M represents a number of sub-frames determining the $CBR_n$, and Q represents a sensing result of a corresponding sub-frame.

In some embodiments, the transmission resources required by the first RAT are determined by channel resources (CRs), where the CRs are determined based on a CBR, and the CRs are configured to determine a size of the transmission resources required by the first RAT and/or the second RAT2 in the shared transmission resources.

In some embodiments, the terminal device is further configured to perform one or more of: preferentially allocating and/or assigning resources in the shared transmission resources to a RAT with a higher RAT priority; preferentially allocating and/or assigning resources in the shared transmission resources to traffic with a higher traffic priority; or preferentially allocating and/or assigning resources in the shared transmission resources to a RAT with a physical sidelink feedback channel (PSFCH).

In some embodiments, resources required by the second RAT include transmission resources required by the PSFCH, where a period of the transmission resources required by the PSFCH is P times a period of the transmission resources required by the first RAT, P being a positive integer.

In some embodiments, the transmission resources required by the PSFCH include a slot where the PSFCH is located. The slot where the PSFCH is located is related to a reference slot, and the reference slot is a start slot of the second RAT in the shared transmission resources.

In some embodiments, the slot where the PSFCH is located satisfies:

$$n + Q * P_{rsvp\_nrTX} * N_{PSSCH}^{PSFCH} - 1,$$

where n represents a location of the reference slot, Q represents a scaling factor and is a positive number, $P_{rsvp\_nrTX}$ represents the period of the transmission resources required by the PSFCH, and $$N_{PSSCH}^{PSFCH}$$

represents that one out or every $$N_{PSSCH}^{PSFCH}$$

slots is the PSFCH.

In some embodiments, in response to a sensing result of the second RAT being greater than or equal to a detection threshold, R is an integer greater than or equal to 2.

In some embodiments, the detection threshold is preset and/or set by a higher layer of the second RAT.

In some embodiments, resources required by the second RAT include transmission resources required by the PSFCH, where locations of the transmission resources required by the PSFCH in the shared transmission resources are pre-configured.

In some embodiments, resources required by the second RAT include transmission resources required by the PSFCH, and transmission over the PSFCH is prohibited in the shared transmission resources.

In a third aspect, a communication apparatus is provided. The communication apparatus includes a memory and a processor. The memory is configured to store one or more programs, and the processor is configured to call the one or more programs stored in the memory to perform some or all of the steps in the method according to the first aspect.

In a fourth aspect, a communication system is provided. The communication system includes the terminal device as described above. In some embodiments, the communication system may further include other devices interacting with the terminal device in the technical solutions according to the embodiments of the present disclosure.

In a fifth aspect, a computer-readable storage medium is provided. The computer-readable storage medium stores a computer program causing a terminal device to perform some or all of the steps in the method according to the various aspects.

In a sixth aspect, a computer program product is provided. The computer program product includes a non-transitory computer-readable storage medium storing a program. The computer program is operable to cause the terminal device to perform some or all the steps in the method according to the various aspects. In some embodiments, the computer program product may be a software package.

In a seventh aspect, a chip is provided. The chip includes a memory and a processor. The processor is configured to call and run a computer program from the memory to perform some or all of the steps in the method according to the various aspects.

According to the embodiments of the present disclosure, the second RAT may acquire the first information of the first RAT, and then the second RAT may schedule the first RAT and/or the second RAT based on the first resources indicated by the first information, so that transmission collisions between the first RAT and the second RAT can avoided.

DETAILED DESCRIPTION OF THE EMBODIMENTS

The technical solutions in the embodiments of the present disclosure are described in detail clearly and completely hereinafter with reference to the accompanying drawings. Apparently, the described embodiments are only a part, but not all, of the embodiments of the present disclosure. For ease of understanding, the terms and communication processes involved in the present disclosure are described hereinafter first.

Figure 1:
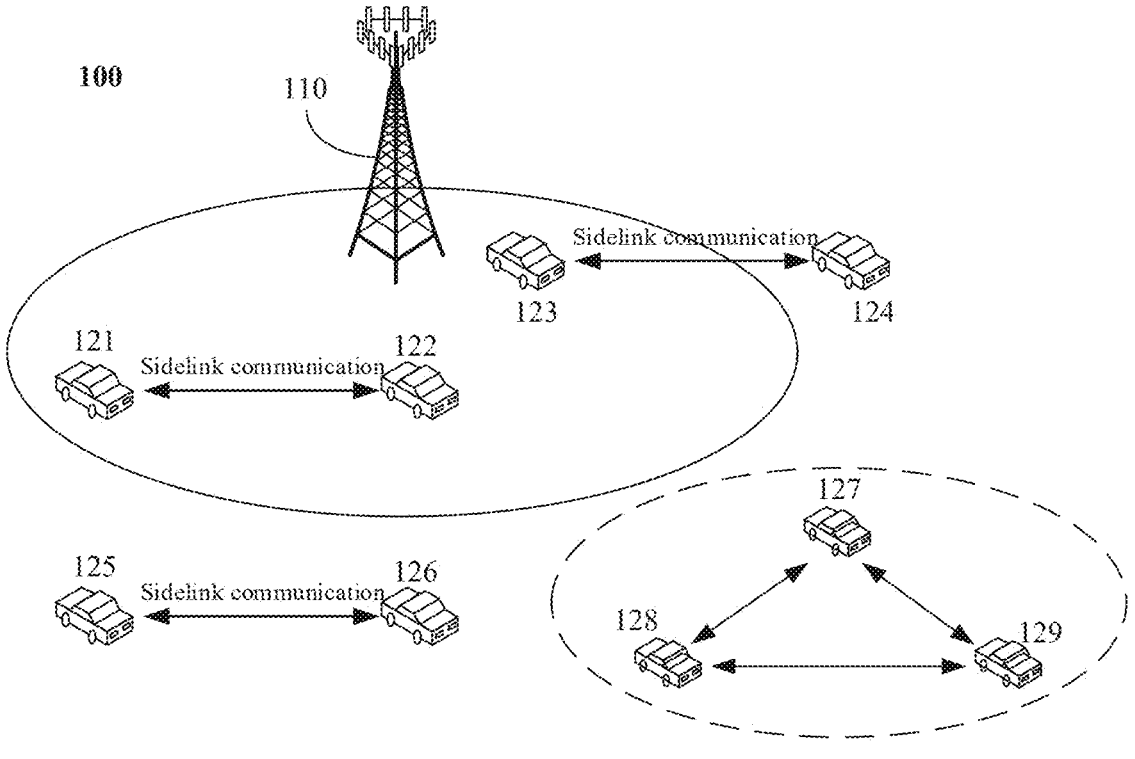
FIG. 1 is an exemplary diagram of a wireless communication system applicable to embodiments of the present disclosure.

FIG. 1 is an exemplary diagram illustrating a system architecture of a wireless communication system 100 applicable to embodiments of the present disclosure. The wireless communication system 100 includes a network device 110 and terminal devices 121 to 129. The network device 110 may provide communication coverage for a specific geographical area, and may communicate with a terminal within the coverage area.

In some implementations, the terminal devices may communicate with each other over a sidelink (SL). Sidelink communication may also referred to as proximity services (ProSe) communication, unilateral communication, sidelink communication, device-to-device (D2D) communication, or the like.

Alternatively stated, sidelink data may be transmitted over the slidelink between the terminal devices. The sidelink data may include data and/or control signalings. In some implementations, the sidelink data may include, for example, a physical sidelink control channel (PSCCH), a physical sidelink share channel (PSSCH), a PSCCH demodulation reference signal (DMRS), a PSSCH DMRS, a physical sidelink feedback channel (PSFCH), or the like.

Hereinafter, several common sidelink communication scenarios are introduced with reference to FIG. 1. In sidelink communication, three scenarios may be involved depending on whether terminal devices in a sidelink are within a coverage area of a network device. In scenario 1, the terminal devices perform sidelink communication within the coverage area of the network device. In scenario 2, some of the terminal devices perform sidelink communication within the coverage area of the network device. In scenario 3, the terminal devices perform sidelink communication outside the coverage area of the network device.

As illustrated in FIG. 1, in scenario 1, terminal devices 121 and 122 may communicate with each other over the sidelink, and the terminal devices 121 and 122 are both within the coverage area of the network device 110, or the terminal devices 121 and 122 are both within the coverage area of the same network device 110. In this scenario, the network device 110 may transmit a configuration signaling to the network devices 121 and 122, and correspondingly, the terminal devices 121 and 122 perform communication over the sidelink based on the configuration signaling.

As illustrated in FIG. 1, in scenario 2, the terminal devices 123 and 124 may perform communication over the sidelink, where the terminal device 123 is within the coverage area of the network device 110 and the terminal device 124 is outside the coverage area of the network device 110. In this scenario, the terminal device 123 receives configuration information from the network device 110, and carries out communication over the sidelink based on the configuration signaling. However, with respect to the terminal device 124, since the terminal device 124 is outside the coverage area of the network device 110, the terminal device 124 cannot receive configuration information from the network device 110. In this case, the terminal device 124 may acquire configuration for sidelink communication based on pre-configured configuration information and/or configuration information sent by the terminal device 123 within the coverage area, and hence communicate with the terminal device 123 over the sidelink based on the acquired configuration.

In some cases, the terminal device 123 may transmit the above configuration information to the terminal device 124 over a physical sidelink broadcast channel (PSBCH), to configure the terminal device 124 to carry out communication over the sidelink.

As illustrated in FIG. 1, in scenario 3, the terminals 125 to 129 are all outside the coverage area of the network device 110, and thus cannot communicate with the network device 110. In this case, the terminal devices may all carry out sidelink communication based on the pre-configured information.

In some cases, the terminal devices 127 to 129 outside the coverage area of the network device may constitute a communication group, and the terminal devices 127 to 129 in the communication group may communicate with each other. In addition, the terminal device 127 in the communication group may serve as a central control node, which is also referred to as a cluster header (CH) terminal, and the other terminal devices in the communication group may also be referred to as "cluster members" (or group members).

The terminal device 127 as the CH may have one or more of the following functions: establishing the communication group; granting join and leave of group members; performing resource coordination to allocate sidelink resources to the group members, and receiving sidelink feedback information from the group members; performing resource coordination with other communication groups; and the like.

It should be noted that FIG. 1 exemplarily illustrates one network device and a plurality of terminal devices. In some embodiments, the wireless communication system 100 may include a plurality of network devices and each of the network devices provide a coverage area for other numbers of terminal devices, which is not limited in the embodiments of the present disclosure.

In some embodiments, the wireless communication system 100 may further include other network entities such as a network controller and a mobility management entity, which is not limited in the embodiments of the present disclosure.

It should be understood that the technical solutions in the embodiments of the present disclosure may be applied to various communication systems, for example: a 5th generation (5G) or a new radio (NR) system, a long-term evolution (LTE) system, an LTE frequency-division duplex (FDD) system and an LTE time-division duplex (TDD) system. The technical solutions in the embodiments of the present disclosure may also be applied to future communication systems, such as a 6th generation (6G) mobile communication system and a satellite communication system.

The terminal device in the embodiments of the present disclosure may also be referred to as a user equipment (UE), an access terminal, a subscriber unit, a subscriber station, a mobile station (MS), a mobile terminal (MT), a remote station, a remote terminal, a mobile device, a user terminal, a wireless communication device, a user agent, or a user apparatus. The terminal device in the embodiments of the present disclosure may refer to a device that provides voice and/or data connectivity for users and can be used for connection among human, objects, and machines, such as a handheld device and a vehicle-mounted device having a wireless connection function. The terminal device in the embodiments of the present disclosure may be a mobile phone, a pad, a laptop, a palmtop, a mobile internet device (MID), a wearable device, a vehicle, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like. In some embodiments, the terminal device may serve as a base station. For example, the terminal device may serve as a dispatch entity, which provides sidelink signals between terminal devices in vehicle-to-everything (V2X), D2D or the like. For example, a cellular phone and a vehicle communicate with each other based on the sidelink data. The cellular phone and a smart home device communicate with each other without relaying communication signals through a base station.

The network device in the embodiments of the present disclosure may be a device for communication with the terminal device. The network device may also be referred to as an access network device or a wireless access network device. For example, the network device may be a base station. The network device in the embodiments of the present disclosure may refer to a radio access network (RAN) node (or device) that allows a terminal device to access to a wireless network. The base station may broadly cover, or be replaced with, various names such as a node B (NodeB), an evolved NodeB (eNB), a next generation NodeB (gNB), a relay station, a transmitting and receiving point (TRP), a transmitting point (TP), an access point (AP), a primary station MeNB, and a secondary station SeNB, a multi-standard radio (MSR) node, a home base station, a network controller, an access node, a wireless node, a transit node, a transceiver node, a baseband unit (BBU), a remote ratio unit (RRU), an active antenna unit (AAU), a remote radio head (RRH), a central unit (CU), a distributed unit (DU), a location node, and the like. The base station may be a macro base station, a micro base station, a relay node, a donor node, or the like, or a combination thereof. The base station may also refer to a communication module, a modem, or a chip configured in the above apparatus or device. The base station may also be a device that assumes the function of a base station in a mobile switching center and D2D, V2X, or machine-to-machine (M2M) communication, a network-side device in a 6G network, a device that assumes the function of a base station in a future communication system, or the like. The base station may support networks of the same or different access technologies. The embodiments of the present disclosure do not limit the adopted specific technology and specific device form of the network device.

The base station may be stationary or mobile. For example, a helicopter or unmanned aerial vehicle may be configured to serve as a mobile base station, and one or more cells may move depending on the location of the mobile base station. In other examples, the helicopter or unmanned aerial vehicle may be configured to serve as a device to communicate with another base station.

In some deployments, the network device in the embodiments of the present disclosure may refer to a CU or a DU, or the network device includes a CU and a DU. The gNB may also include an AAU.

The network device and the terminal devices may be deployed on land, including indoor or outdoor, hand-held, or vehicle-mounted; or may be deployed on the water surface; or may be deployed on airplanes, balloons, and satellites. In the embodiments of the present disclosure, the scenario where the network device and the terminal devices are located is not limited.

It should be appreciated that all or some of the functions of the communication devices in the present disclosure may also be implemented by software functions running on hardware, or by virtualization functions instantiated on a platform (e.g., a cloud platform).

Communication Mode Over Sidelink

Figure 2:
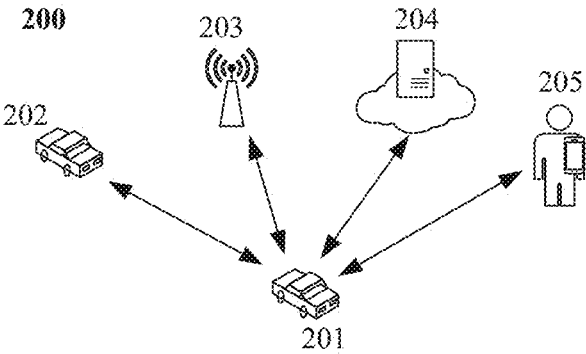
FIG. 2 is an exemplary communication diagram of NR-V2X.

With the development of the sidelink communication technology, the sidelink communication technology involves information interactions between various terminals. Using a V2X communication system 200 as illustrated in FIG. 2 as an example, vehicle-to-vehicle (V2V) communication carried out between a terminal device 201 and a terminal device 202 involves information interactions between vehicles themselves. Vehicle-to-infrastructure (V2I) communication, vehicle-to-network (V2N) communication, and vehicle-to-pedestrian (V2P) communication carried out between the terminal device 201 and respective terminal devices 203 to 205 involve information interactions between vehicles and an external system.

The gradual expansion of the scope of information interaction places greater demands on the communication system. For example, the communication system is required to support a higher throughput, a lower latency, a higher reliability, a larger coverage area, and a more flexible resource allocation. Using the development of V2X as an example, in LTE-V2X, only a mode of broadcast is supported for sidelink communication between the terminal devices. In NR-V2X, three communication modes (i.e., broadcast, multicast, and unicast) may be supported.

The broadcast is a most basic communication mode in sidelink communication. With respect to the broadcast transmission mode, a terminal device receiving sidelink data may be any terminal device in the vicinity of a terminal device serving as a transmitter. For example, referring to FIG. 1, assuming that the terminal device 125 serves as a transmitter and transmits sidelink data in a broadcast mode, the terminal devices 121 to 124 and 126 to 129 in the vicinity of the terminal device 125 may each serve a receiver receiving the sidelink data.

Groupcast communication is configured to support information interactions between terminal devices within a specific group (or referred to as a communication group), to assist in implementation of negotiation, decision making and the like between the terminal devices in the group. Sidelink groupcast is categorized into two transmission types. The first type is oriented towards a fixed group (i.e., a managed group) with stable connection relationships, and with explicit ID information and information about group members. The second type is oriented towards a temporary group (i.e., a connectionless group) established in a connectionless manner, and is, for example, a groupcast dynamically established based on a distance, where a communication distance of current traffic needs to be explicitly indicated.

With respect to the groupcast transmission mode, terminal devices receiving sidelink data may be all terminal devices in a communication group. Alternatively, terminal devices receiving sidelink data may be all terminal devices within a specific transmission distance. For example, referring to FIG. 1, for a communication group including the terminal devices 127 to 129, when the terminal device 127 transmits sidelink data in the groupcast mode, the other terminal devices 128 and 129 in the communication group are receiving terminals that receive the sidelink data. As another example, referring to FIG. 1, assuming that terminal devices within a predetermined area include the terminal devices 127 to 129, when the terminal device 127 transmits sidelink data in the groupcast mode, the other terminal devices 128 and 129 within the predetermined area are all receiving terminals that receive the sidelink data.

Sidelink communication between two terminal devices may be implemented by unicast communication. Using NR-V2X as an example, reliable communication between terminal devices may be implemented by a radio resource control (RRC) signaling based on a PC5 interface.

With respect the unicast transmission mode, there is typically only one terminal device that receives sidelink data. Referring to FIG. 1, the terminal device 121 and the terminal device 122 may communicate with each other based on the unicast transmission mode. For example, when the terminal device 121 is in sidelink communication with terminal device 122, the terminal device 122 serves as the only receiving device to receive sidelink data. The sidelink data may include a PSSCH and a PSCCH. By demodulation, the terminal device 122 may acquire sidelink control information (SCI) related to sidelink transmission and scheduling. The SCI may assist the terminal device 122 in receiving and decoding sidelink information.

In some communication systems (e.g., NR-V2X), sidelink unicast and groupcast traffic supports a hybrid automatic repeat request (HARQ) mechanism through acknowledgement (ACK)/negative acknowledgement (NACK). For groupcast traffic, NACK-only HARQ may also be employed. In addition, a blind retransmission mechanism is supported. A sidelink HARQ feedback is transmitted by a terminal device at a receiving end to a terminal device at a transmitting end over the PSFCH.

In communication standards, sidelink communication have been studied and standardized. For example, in Rel-16, RAN has studied sidelink communication, primarily to support advanced V2X applications. In Rel-17, SA2 has studied and standardized proximity-based services, including public safety and business-related services. As part of Rel-17, energy-saving solutions (e.g., partial sensing, discontinuous reception (DRX)), solutions of coordination between terminal devices and the like have been developed in RAN1 and RAN2 to reduce power consumption of battery-limited terminal devices and improve reliability of sidelink transmission.

CBRCoexistence of Different Radio Access Technologies (RATs) in a Co-Channel Market penetration of sidelink communication systems may increase over time, but different V2X-based RATs may need to coexist in a co-channel scenario, i.e., V2X devices of different RATs may coexist on the same frequency channel. For example, LTE V2X and NR V2X may exist in the same terminal device, i.e., LTE V2X and NR V2X need to coexist in a co-channel scenario. Coexistence of different RATs on the co-channel enables a higher data rate and supports a larger bandwidth for an intelligent transportation system (ITS) band. However, for the ITS band, LTE V2X in LTE V2X and NR V2X may likely be prioritized to achieve a basic safe use case of V2X in a relatively short time. It is necessary to enable a co-channel coexistence mechanism that can ensure time alignment between slots of different RATs. It should be understood that in some cases, for example, when a Rel-16 intra-device coexistence framework is not supported, the same synchronization source needs to be used for different RATs. In this case, the understandings of time for different RATs are the same and no inter-system inference may occur. However, synchronization sources for different RATs may be different, and this problem may only occur at a corner. For example, when a terminal device moves outside a particular coverage area with associated synchronization source changed, implementation-based solutions may be defined.

For coexistence of devices with different RATs in using a common carrier frequency, it is important that there is a mechanism to efficiently utilize the resource allocation of multiple RATs without interfering with operations of the RATs. First, the design principles of the co-channel coexistence mechanism between different RATs are discussed. The applicants believe that for an LTE SL and an NR SL, a basic design principle may be to ensure backward compatibilities of an R14/R15 LTE SL and an R16/R17 NR SL. In addition, it is also important to reuse the intra-device coexistence framework defined in Rel-16 as much as possible. Furthermore, it is more desirable to consider no or limited performance degradation in the LTE SL.

Types of the terminal devices may include, for example, class A to class E devices as described below. Class A devices are Rel-18 devices including an LTE SL and an NR SL. Class B devices are Rel-18 devices including only an NR SL. Class C devices are Rel-14/Rel-15 devices including only an LTE SL. Class D devices are Rel-16/17 devices including only an NR SL. Class E devices are Rel-16 devices including an LTE SL and an NR SL. It can be seen that both class A and class E devices include two types of RATs, namely, an LTE SL and an NR SL.

It should be understood that in the case where multiple RATs are included in the terminal device, interference may occur between the multiple RATs. In view of this problem, embodiments of the present disclosure provide a method for communication.

Figure 3:
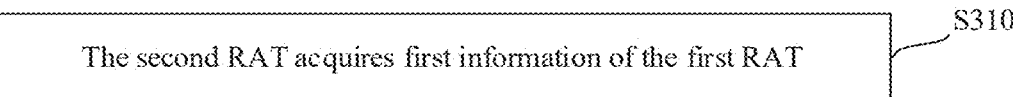
FIG. 3 is a schematic flowchart of a method for communication according to some embodiments of the present disclosure.

FIG. 3 is a schematic flowchart of a method for communication according to some embodiments of the present disclosure.

The method shown in FIG. 3 may be performed by a terminal device. The terminal device may include at least two different RATs. For example, the terminal device may include a first RAT and a second RAT. The first RAT may coexist with the second RAT on the same channel. Each of the first RAT and the second RAT may be based on a sidelink. For example, the first RAT may be an LTE SL and the second RAT may be an NR SL. Alternatively, the first RAT may be an NR SL and the second RAT may be an LTE SL.

It should be noted that the embodiments of the present disclosure do not limit the presentation form of the first RAT or the second RAT in the terminal device. For example, the first RAT or the second RAT may be present in the terminal device in the form of a module, a chip, or the like.

The method as illustrated in FIG. 3 may include operation S310. In S310, the second RAT acquires first information of the first RAT.

The first information may indicate information related to first resources of the first RAT. In other words, the first RAT may share the information related to the first resources to the second RAT through the first information. The first resources may be resources related to the first RAT. For example, the first resources may include resources actually used by the first RAT, reserved resources of the first RAT, resources to be used by the first RAT, resources shared by the first RAT and the second RAT, and the like.

In some embodiments, the information related to the first resources may include sensing information and/or resource information of the first RAT.

The first RAT may sense a channel to obtain sensing information. For example, the sensing information may be used to indicate a sensing result sensed by the first RAT. A terminal device may obtain a sensing result by perception, measurement or the like. Therefore, in some embodiments, the sensing result may also be referred to as a perception result or a measurement result. The sensing result may include one or more of the following parameters sensed on a signal and/or a channel of the first RAT: sidelink reference signal received power (SL RSRP), sidelink reference signal received quality (SL RSRQ), and sidelink received signal strength indicator (SL RSSI). The present disclosure is not limited to the above-described signal and/or channel of the first RAT, that is, the sensing result may be obtained by sensing any signal and/or any channel associated with the first RAT. For example, the sensing result may be determined from a measurement of a received signal containing control information.

As a specific implementation, the terminal device may measure RSSI parameters (e.g., SL RSSI parameters) associated with various sidelink channels to obtain a sensing result. Alternatively, the terminal device may measure RSRP parameters (e.g., PSSCH-RSRP parameters) associated with various sidelink channels to obtain a sensing result. Alternatively, the terminal device may measure RSRQ parameters (e.g., PSSCH-RSRQ parameters) associated with various sidelink channels to obtain a sensing result.

The resource information may indicate information of resources related to the first RAT. The resources related to the first RAT may include, for example, one or more of: reserved resources of the first RAT, transmission resources of the first RAT, sub-channels, a candidate resource set, logical sub-frames, a priority, or the like.

Upon acquiring the first information shared by the first RAT, the second RAT may determine the first resources of the first RAT based on the first information, so as to select/schedule the resources. In this way, transmission collisions between the first RAT and the second RAT can be avoided.

In some embodiments, the first information includes one or more of the following information of the first RAT: information related to reserved resources of the terminal device, information related to reserved resources determined by decoding SCI, sub-channel configuration information, a candidate resource set, information related to logical sub-frames, priority information, or information related to transmission resources. The above information is described in detail hereinafter.

The reserved resources of the first RAT may include the reserved resources determined by the terminal device through decoding the SCI, and/or the reserved resources of the terminal device. The reserved resources of the terminal device may be reserved resources of the terminal device for transmission in the first RAT. The information related to the reserved resources may include one or more of: count value, transmission time, frequency location, period, and the like.

The sub-channel configuration information of the first RAT may include one or more of: number of sub-channels, and number of physical resource blocks (PRBs) per sub-channel. The sub-channel configuration information is important for determining resource overlap in a frequency domain between the reserved resources of the first RAT and candidate single-slot resources of the second RAT based on sensing information about time and frequency locations of reserved resources of the terminal device containing other first RATs.

The candidate resource set of the first RAT may include a candidate resource set SA and/or a candidate resource set SB.

The information related to the logical sub-frames of the first RAT may indicate information related to slots, frames, sub-frames or the like of the first RAT. For example, the information related to the logical sub-frames of the first RAT may indicate information about a frame structure or the like of the first RAT.

The priority information may indicate a priority associated with transmission of the first RAT. For example, priority information may include a priority of the first RAT, and/or a priority of traffic transmitted by the first RAT. The priority information may be determined by decoding the SCI or may be determined by transmission of the terminal device itself.

The information related to the transmission resources may indicate information about resources occupied by the first RAT of the terminal device during actual transmission. The information related to the transmission resources may include, for example, the time and/or the frequency locations of the resources used by the first RAT in transmission.

The first information may further include other information related to the transmission resources of the first RAT. For example, the first information may include resources corresponding to half-duplex sub-frames not monitored by the terminal device of the first RAT. Alternatively, the first information may include available resources of the first RAT determined by decoding the SCI and/or the transmission of the terminal device itself.

As described above, based on the first information shared by the first RAT, the second RAT can achieve resource selection/scheduling to avoid resource collisions. In some embodiments, the first information may also be available to the first RAT. For example, the first RAT may filter contents of the first information shared to the second RAT based on information about the SL RSRP and the priority of the first RAT, so as to achieve a higher usage rate of the resources of the first RAT.

In some embodiments, with respect to a resource pool shared by the first RAT and the second RAT, the second RAT is expected to use the first information of the first RAT. For example, a higher layer of the second RAT may request the terminal device to determine a resource subset. The higher layer may select resources for PSSCH and/or PSCCH transmission from the resource subset. To trigger the process, the higher layer may provide parameters for the PSSCH and/or the PSCCH transmission in a slot n. The present disclosure proposes that the second RAT may acquire the first information at T milliseconds prior to the slot n to determine a set of resources for new transmission or retransmission of the second RAT itself. T satisfies $T \leq T_{max}$, where $T_{max}$ may be a positive integer. For example, $T_{max}$ may be 4 ms, 8 ms, or the like.

In other embodiments, the second RAT may acquire the first information within a first time window (T_win) to determine transmission resources of the second RAT in the resource pool shared by the first RAT and the second RAT. That is, the second RAT may use the first information shared by the first RAT within the first time window (T_win) to determine transmission resources available to the second RAT in the shared resource pool. The first time window for the second RAT to implement the resource selection may be larger than the traffic periods on the first RAT and the second RAT. Alternatively, the first time window may be a period during which the first RAT updates the first information. It should be appreciated that this enables the second RAT to capture a long-term traffic trend of the first RAT during resource selection, and that the second RAT does not react to transient fluctuations in traffic patterns. For example, a slot $n_0$ may represent a slot in which the second RAT uses the first information of the first RAT. In the slot $n_0$, the second RAT may use all the resource information in the first information of the first RAT no later than a slot $n_{0-T}$ and no earlier than a slot $n_{0-T\_valid}$. The slot $n_{0-T}$ is a $T^{th}$ slot after the slot $n_0$, where T is less than or equal to $T_{max}$, and $T_{max}$ may be a positive integer. For example, $T_{max}$ may be 4 ms, 8 ms, or the like. Based on these definitions, the first time window T_win may satisfy: $T\_win=T_{valid}-T$. T_win may be a time window in which the first information is considered for resource selection (reselection) of the second RAT. It will be appreciated that by specifying the value of $T_{valid}$, the second RAT does not use outdated resource sharing information.

The embodiments of the present disclosure do not limit the manner in which the second RAT acquires the first information, nor do they limit the manner in which the first RAT shares the first information.

As an implementation, the first information may be shared by means of a buffer. The first RAT may write the first information to the buffer and the second RAT may read the first information from the buffer.

Figure 4:
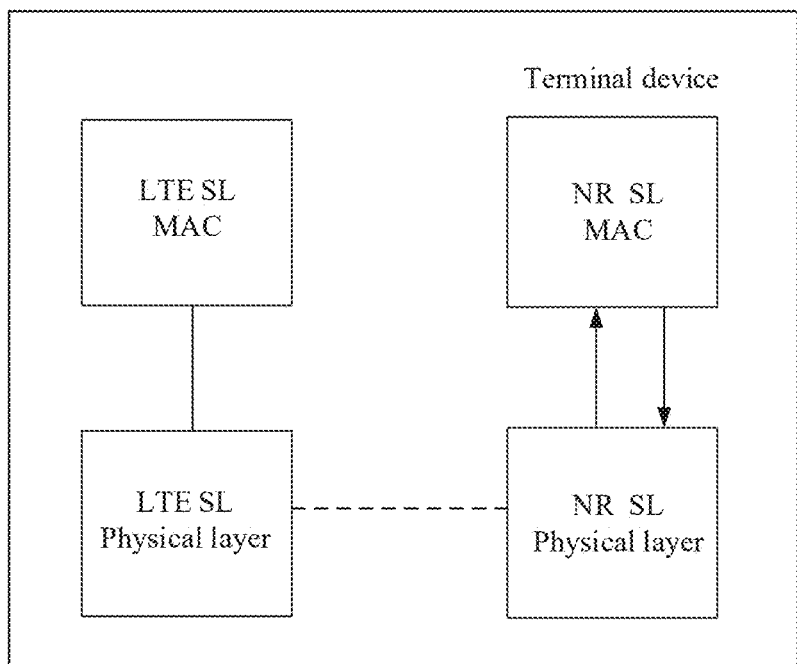
FIG. 4 is a schematic diagram of a sharing interface according to some embodiments of the present disclosure.

As an implementation, the first information may be shared over a sharing interface. The sharing interface may be established between a physical layer of the first RAT and a physical layer of the second RAT. Alternatively, the sharing interface may be established between a medium access control (MAC) layer of the first RAT and a MAC of the second RAT. FIG. 4 gives illustration using the first RAT being an LTE SL and the second RAT being an NR SL as an example. As illustrated in FIG. 4, a sharing interface is established between a physical layer of the LTE SL and a physical layer of the NR SL.

In some embodiments, the second RAT may transmit a first request message. The first request message may be initiated for requesting acquisition of the first information. The first request message may be directly transmitted to the first RAT. For example, the first request message may be transmitted to the first RAT via the sharing interface. The first request message may also be transmitted to the buffer. After receiving the first request message, the first RAT and/or the buffer may transmit the first information to the second RAT. In other words, the second RAT may receive the first information in response to transmission of the first request message.

Figure 5:
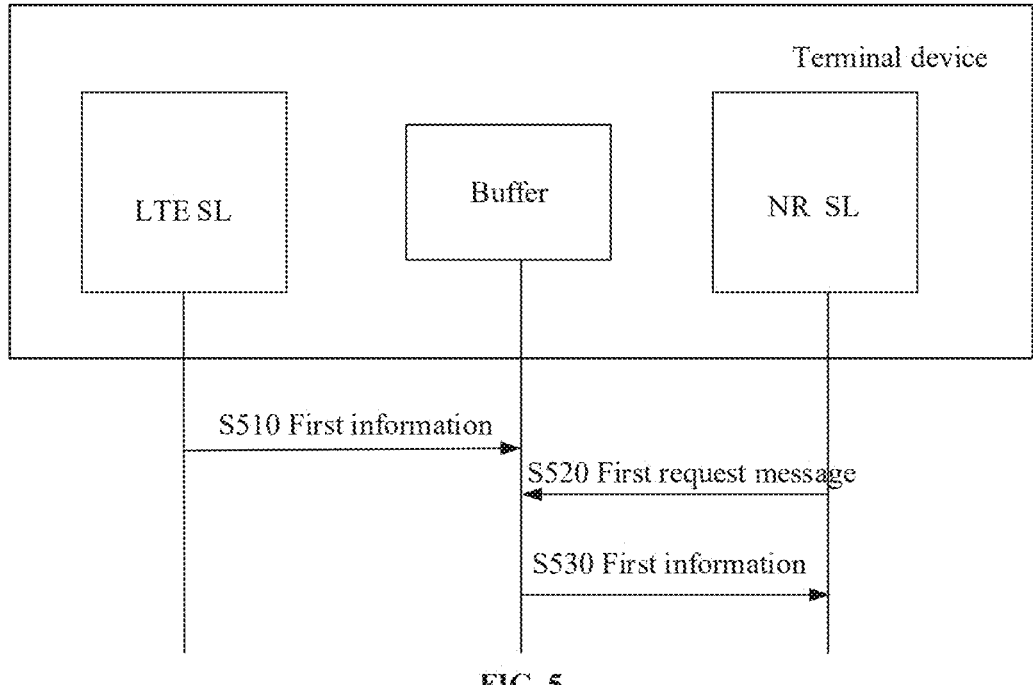
FIG. 5 is a schematic flowchart of another method for communication according to some embodiments of the present disclosure.

FIG. 5 illustrates sharing of the first information by taking as an example a case where the first RAT is an LTE SL, the second RAT is an NR SL and the first information is shared by a buffer. The method as illustrated in FIG. 5 may include operations S510 to S530. In S510, a LTE SL transmits the first information to a buffer.

In S520, a NR SL transmits a first request message to the buffer. That is, the NR SL triggers acquisition of the first information.

It should be noted that the present disclosure does not limit the sequence of operation S510 and operation S520. For example, the LTE SL may first transmit the first information to the buffer, and in the case where the first information is stored in the buffer, the NR SL may transmit the first request message to the buffer. Alternatively, the NR SL may first transmit the first request message to the buffer, and in response to the first request message, the LTE SL may transmit first information to the buffer to update the first information stored in the buffer.

In S530, in response to the first request message, the NR SL may read the first information from the buffer. Alternatively, the buffer transmits the first information in response to the first request message. Correspondingly, the NR SL receives the first information transmitted by the buffer in response to the first request message.

In some embodiments, the first RAT may share the first information based on one or more of: time, a message, and pre-configuration.

As an implementation, the first RAT may share the first information based on the time. For example, the first RAT may periodically share the first information. A period during which the first RAT updates (or writes) the first information may, for example, be indicated by T1. The first RAT may trigger an update of the first information at a period of $\{T_1, 2T_1, 3T_1 \ldots \}$.

As an implementation, the first RAT may share the first information based on the message. For example, in the case where the first RAT needs to transmit a first message, the first RAT may share the first information. Alternatively, in the case where the second RAT needs to transmit a second message, the first RAT may share the first information.

As an implementation, the first RAT may share the first information based on the pre-configuration. The pre-configuration may include, for example, a period for sharing the first information and a condition for sharing the first information.

In some embodiments, the second RAT may trigger acquisition of the first information based on a trigger condition related to one or more of: time, traffic, message, pre-configuration, and sensing result, which are respectively described below.

In some implementations, the trigger condition may be related to the time. For example, the second RAT may periodically acquire the first information shared by the first RAT. The period during which the second RAT reads the first information may be denoted, for example, by $T_2$. The second RAT may trigger reading of the first information at a period of $\{T_2, 2T_2, 3T_2 \ldots \}$. Taking a buffer as an example, the second RAT may periodically transmit the first request message. When the buffer receives the first request message, the buffer may transmit the first information to the second RAT. Alternatively, the first RAT may periodically update the shared first information.

It should be noted that the update of the first information by the first RAT may be earlier than the reading of the first information by the second RAT, so that the second RAT can acquire the latest first information.

In some implementations, the trigger condition may be related to the sensing result of the first RAT. For example, in the case where the sensing result of the first RAT is less than or equal to a first threshold, the second RAT may acquire the first information. That is, in response to the sensing result of the first RAT being less than or equal to the first threshold, the second RAT may acquire the first information. The first threshold may be preset, or configured through a high-layer signaling, or defined by a standard. The sensing result may include a measurement of one or more of: RSRP, RSRQ, or RSSI. Using a sharing interface as an example, an MAC layer of the first RAT may trigger an MAC layer of the second RAT in the case where the sensing result of the first RAT is less than or equal to the first threshold. Further, the MAC layer of the second RAT may trigger a physical layer of the second RAT to read the first information via the sharing interface.

It should be understood that in the case where the sensing result of the first RAT is less than or equal to the first threshold value, it may be considered that the first RAT has a poor coverage effect, and the resources of the first RAT may be released to the second RAT. Therefore, the relevance of the trigger condition to the sensing result can optimize the use of resources by the first RAT and the second RAT.

In some implementations, the trigger condition may be related to the traffic, i.e., the trigger condition may include a traffic trigger condition. For example, the traffic trigger condition is related to whether the second RAT needs to transmit traffic data. That is, the second RAT may acquire the first information in the case where the traffic trigger condition is satisfied. That is, in response to the second RAT needing to transmit the traffic data, the second RAT may acquire the first information. It may be considered that the second RAT needs to transmit traffic data in the case where the second RAT needs to transmit the following information: information transmitted via an SL interface, information for transmitting coordination information between terminal devices, traffic data, and the like. Using a buffer as an example, in the case where the second RAT needs to transmit traffic data, traffic data from the MAC layer of the second RAT may trigger the physical layer of the second RAT. The physical layer of the second RAT may then trigger transmission of the first request message. In the case where the buffer receives the first request message, the first information shared by the first RAT may be transmitted to the second RAT.

In some communication systems (e.g., NR V2X), not all sidelink communication traffic is periodic. Event-triggered traffic is unpredictable. For example, in case of an emergency, the terminal device may generate a brake message. Some event-triggered non-periodic traffic data, such as a pre-crash warning, is more important than periodically transmitted data. Fast and reliable transmission of the non-cyclical information is crucial. Therefore, for a sidelink resource transmission mode (i.e., mode 2) determined by the terminal device, the event-triggered traffic requires a fast sensing mechanism in order to enable timely delivery of the generated message. It can be seen therefrom that, based on the technical solution of the trigger condition related to the traffic according to the present disclosure, the terminal device is capable of quickly optimizing resource allocation, avoiding resource collisions, and thus meeting the requirements of rapid and reliable data transmission.

For the entire resource set, the first RAT and the second RAT may be made to use the resource set by different resource allocation schemes.

As an implementation, the entire resource set may be divided into two parts: a first part and a second part. Resources in the first part may be used only by the first RAT, and resources in the second part may be used only by the second RAT. The second RAT may acquire information about the resources in the first part through the first information, and thus determines information about the resources in the second part. Using as an example the first RAT being an LTE SL and the second RAT being an NR SL, when the NR SL performs a resource selection (or reselection) process, available resources of the LTE SL indicated in the first information (i.e., the resources in the first part) are excluded from a candidate resource set of the NR SL, namely, available resources of the NR SL can be determined.

In some embodiments, the resources of the first RAT may be excluded based on an average of sensing results. Using the sensing result being an RSSI as an example, the resources of the first RAT may be excluded by statistically collecting average S-RSSI measurement value in the subframe. Exclusion of the resources of the first RAT based on the RSSI average may be implemented based on frequency-specific resources of the S-RSSI measured in the prior sub-frame. That is, instead of excluding all resources in the sub-frame, a subset of the resources in the sub-frame may be excluded.

As another implementation, the entire resource set may be divided into three parts: a first part, a second part, and a third part. Resources in the first part may be used only by the first RAT, resources in the second part may be used only by the second RAT, and resources in the third part may be used by both the first RAT and the second RAT. That is, the resources in the third part may be shared resources or cross resources of the first RAT and the second RAT. Therefore, in some embodiments, the resources in the third part may also be referred to as shared transmission resources, cross resources, or a shared resource pool.

It should be noted that in some embodiments, the resources in the first part may be referred to as reserved resources, proprietary resources, or pre-configured resources of the first RAT. The resources in the second part may be referred to as reserved resources, proprietary resources, or pre-configured resources of the second RAT.

The resource allocation of the shared transmission resources may be performed at the MAC layer of the second RAT. That is, the use and allocation of the shared transmission resources need to be scheduled and allocated by the MAC layer of the second RAT. Using the second RAT being an NR SL as an example, the resource allocation of the shared transmission resources may be performed at the MAC layer of the NR SL. The candidate resource set SA or SB may be shared by the first RAT. The first RAT may generate the candidate resource set SB in the physical layer, and finally report the candidate resource set SB to a higher layer. The shared transmission resources may be determined after the first RAT generates the candidate resource set SB (the first RAT then provides, via its internal interface, the candidate resource set SB to the MAC layer of the second RAT). The shared transmission resources may be, for example, resources selected in an intersection of candidate resource sets of the first RAT and the second RAT. Using the second RAT being an NR SL and the first RAT being an LTE SL as an example, NR SL MAC may select resources from the intersection of the candidate resource sets acquired by the NR SL and the LTE SL. Thus, selecting those resources that are evaluated as interfering NR and LTE SL terminal devices can be avoided.

In the case where the first RAT and the second RAT each have insufficient resources reserved and/or configured, resources may be selected from the shared transmission resources. How to allocate resources to the first RAT and the second RAT in the shared transmission resources is described below.

In some embodiments, the first information may indicate the transmission resources required by the first RAT in the shared transmission resources. It should be noted that the transmission resources required by the first RAT may be transmission resources actually occupied by the first RAT, transmission resources available to the first RAT, or transmission resources reserved by the first RAT.

Based on the transmission resources required by the first RAT, the second RAT may determine transmission resources required by or available to the second RAT in the shared transmission resources. For example, in the shared transmission resources, resources other than the transmission resources required by the first RAT may all be transmission resources available to the second RAT.

In some embodiments, a proportion of the transmission resources required by the first RAT in the shared transmission resources may be configured or predefined. For example, the proportion may be defined as 20%, 30%, 40%, 50%, or the like. Alternatively, a proportion of transmission resources required by the first RAT in the shared transmission resources may be configured based on a proportion of the reserved transmission resources of the first RAT. As an implementation, the proportion of the reserved transmission resources of the first RAT may be inversely proportional to the proportion of the transmission resources required by the first RAT in the shared transmission resources, and the proportion of the reserved transmission resources of the second RAT is may be inversely proportional to the proportion of the transmission resources required by the second RAT in the shared transmission resources.

In some embodiments, both the first RAT and the second RAT may need to use the shared transmission resources. For example, in the case where both reserved resources of the first RAT and reserved resources of the second RAT have been used up, both the first RAT and the second RAT need to use the shared transmission resources. In this case, the terminal device may preferentially allocate resources to an RAT having a larger sensing result. For example, in the case where a sensing result of the first RAT is greater than a sensing result of the second RAT, resources in the shared transmission resources are preferentially allocated to the first RAT. Alternatively, in the case where a sensing result of the second RAT is greater than a sensing result of the first RAT, resources in the shared transmission resources are preferentially allocated to the second RAT. For example, in the case where NR SL RSSI is greater than LTE SL RSSI and the reserved resources in both RAT modes have been used up, resources in the shared resource pool may be first used by the NR SL.

In some embodiments, in the case where one of the first RAT and the second RAT needs to use the shared transmission resources, the RAT that needs the shared transmission resources may be referred to as a target RAT. That is, the target RAT may be either the first RAT or the second RAT, depending on which RAT needs to use the shared transmission resources. In allocating resources in the shared transmission resources to a target RAT of the first RAT and the second RAT, only a part of the shared transmission resources can be allocated to the target RAT. That is, the shared resource pool may reserve a part of the shared transmission resources for an RAT other than the target RAT. For example, in the case where the first RAT needs to use the shared transmission resources (for example, the reserved resources of the first RAT have been used up, while the reserved resources of the second RAT have not been used up), the terminal device may allocate a part of the shared transmission resources to the first RAT, namely, may not allocate all the shared transmission resources to the first RAT, so as to reserve a part of the shared transmission resources for the second RAT. Alternatively, in the case where the second RAT needs to use the shared transmission resources (for example, the reserved resources of the second RAT have been used up, while the reserved resources of the first RAT have not been used up), the terminal device may allocate a part of the shared transmission resources to the second RAT, namely, may not allocate all the shared transmission resources to the second RAT, so as to reserve a part of the shared transmission resources for the first RAT.

In some embodiments, the transmission resources required by the first RAT in the shared transmission resources may be determined based on a channel busy ratio (CBR). The first RAT may determine a CBR, and the second RAT may determine the transmission resources required by the first RAT based on the CBR. In other words, the terminal device may perform resource selection and/or scheduling by sensing channel availability for transmission. Based on the CBR, a size of the shared transmission resources may be further determined. The CBR may be determined based on the sensing result. For example, the terminal device may measure RSSI parameters (e.g., SL RSSI parameters) associated with various sidelink channels to obtain a sensing result. Alternatively, the terminal device may measure RSRP parameters (e.g., PSSCH-RSRP parameters) associated with various sidelink channels to obtain a sensing result. Alternatively, the terminal device may measure RSRQ parameters (e.g., PSSCH-RSRQ parameters) associated with various sidelink channels to obtain a sensing result. That is, in the case where the sensing result is represented by Q, Q may include one or more of RSRP, RSRQ, and RSSI.

Figure 6:
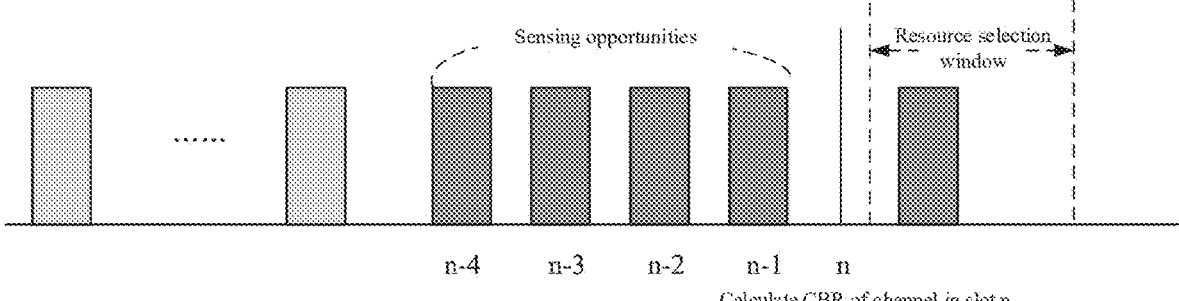
FIG. 6 is a schematic diagram of a method for determining a CRB according to some embodiments of the present disclosure.

The CBR may be determined by sensing results in sensing opportunities. The sensing opportunities may include N sub-frames, and the CBR may be determined based on sensing results in M sub-frames of the N sub-frames. N may be an integer greater than 0, and M may be an integer less than or equal to N. For example, a CBR at a sub-frame n needs to be calculated and determined based on the sensing results in the M sub-frames. For example, the M sub-frames may be one or more of a sub-frame n−1, a sub-frame n−2, a sub-frame n−3, . . . , and a sub-frame n−N. FIG. 6 gives illustration using N=4 as an example. As illustrated in FIG. 4, the measurement of the CBR may be evaluated in PSSCH transmission in the sub-frame n−4. That is, the CBR includes a measurement result in the range of the sub-frame n−4. The resources within the resource selection window may be scheduled and/or selected based on the CBR of the channel calculated at the slot n.

The determination method of the CBR is described in detail hereinafter. A $CBR_n$ corresponding to the sub-frame n may be determined based on one or more of the following factors: an average of the sensing results in the M sub-frames, a variation of the sensing results of the M sub-frames, and a sensing result in the sub-frame n−1. In the case where a sensing result in a sub-frame j is represented by $Q_j$, the average of the sensing results in the M sub-frames may be represented by $$\frac{\sum_{i=1}^{M} Q_{n-i}}{M}.$$

The variation in the sensing results in the M sub-frames may include increasing, decreasing, or unchanged. The variation of the sensing results in the M sub-frames may be represented by sensing results of the sub-frame n−1 and the sub-frame n−2. That is, $Q_{n-1}-Q_{n-2}$ may be used to indicate the variation of the sensing results in the M sub-frames. Based on this, the $CBR_n$ corresponding to the sub-frame n may satisfy $$CBR_n = k1 * \frac{\sum_{i=1}^{M} Q_{n-i}}{M} + k2 * Q_{n-1} + k3 * (Q_{n-1} - Q_{n-2}).$$

Each of k1, k2, and k3 is a number greater than 0 and less than 1. Specific values of k1, k2, and k3 may be predefined, configured, or preset.

As described above, based on the CBR, the size of the shared transmission resources may be further determined. For example, a maximum number of resource blocks (RBs) allowed for use by the terminal device at time n may be determined based on a CBR at the time n.

In some embodiments, the transmission resources required by the first RAT may be determined by a channel resource (CR). The CR may be used to represent channel utilization of the terminal device. Based on the CR, the size of the transmission resources required by the first RAT and/or the second RAT in the shared transmission resources may be further determined. The CBR described above may be used to determine the CR. For example, the larger the CBR, the smaller the available CR. In the case where the CBR exceeds a CBR limit ($CBR_{limit}$), congestion control may be performed by limiting the channel utilization of each terminal device. The determination method of the CR is described in detail hereinafter.

As an implementation, an interval in which the CBR is located may correspond to a value of the CR. For example, intervals of the CBR may include [0, 0.3], [0.3, 0.6], [0.6, 0.8], [0.8, 1], and the like. These intervals may correspond to different CR values.

As an implementation, the CR evaluated at the sub-frame n may be a total number of sub-channels used for transmission in sub-frames [n−a, n−1] and allowed in sub-frames [n, n+b] divided by a total number of sub-channels configured in sub-frames [n−a, n+b] in the transmission resource pool.

In some embodiments, the second RAT acquires the first information, i.e., the CR of the first RAT may be determined based on the CBR, so that the resources required by the second RAT in the shared transmission resources are further determined. For example, the MAC layer of the NR SL may acquire a CBR reported by the LTE SL, so that the CR of the LTE SL is determined, and thus the resources required by the NR SL in the shared resource pool are further determined.

In the case where both the first RAT and the second RAT need to use the shared transmission resources, the method illustrated in FIG. 3 may further include one or more of: preferentially allocating and/or assigning resources in the shared transmission resources to a RAT with a high RAT priority; preferentially allocating and/or assigning resources in the shared transmission resources to traffic with a high traffic priority; preferentially allocating resources in the shared transmission resources to transmit traffic instead of receive traffic; and for different RATs, preferentially allocating and/or assigning resources in the shared transmission resources to a RAT with the PSFCH.

In some embodiments, in response to a priority of the first RAT being higher than a priority of the second RAT, sufficient resources in the shared transmission resources are preferentially allocated to the first RAT. In response to the priority of the second RAT being higher than the priority of the first RAT, sufficient resources in the shared transmission resource are preferentially allocated to the second RAT.

In some embodiments, in response to the priority of the first RAT being the same as the priority of the second RAT, or applications on both the first RAT and the second RAT requiring higher reliability, resources in the shared transmission resources may be preferentially allocated traffic with a high traffic priority.

In some embodiments, a priority of transmit (Tx) traffic may be higher than a priority of receive (Rx) traffic. That is, resources in the shared transmission resources may be preferentially allocated to the transmit traffic compared with the receive traffic. For example, in the case where the NR SL and the LTE SL have equal priorities, transmission collisions between RATs are resolved by prioritizing NR/LTE PSSCH transmit traffic over LTE/NR PSSCH receive traffic. In some embodiments, collisions may also be resolved by prioritizing the NR PSSCH transmit traffic over the LTE PSSCH receive traffic.

In some embodiments, for different RATs, resources in the shared transmission resource may be preferentially allocated and/or assigned to an RAT with the PSFCH. For example, in the case where the NR SL PSFCH and the LTE SL PSSCH have equal transmission priorities, transmission collisions are resolved by prioritizing NR PSFCH Tx/Rx traffic over LTE SL Tx/Rx traffic. For example, in the presence of PSFCH collisions, LTE SL transmission and reception are discarded. For collisions between NR SL Tx and LTE SL Tx, the PSFCH ensures reliable communication over NR since PSFCH transmission and reception are essential features of the NR SL. The present disclosure achieves reliable transmission over the PSFCH by preferentially allocating resources in the shared transmission resources to a RAT with the PSFCH, thereby achieving reliable communication corresponding to the RAT.

Figure 7:
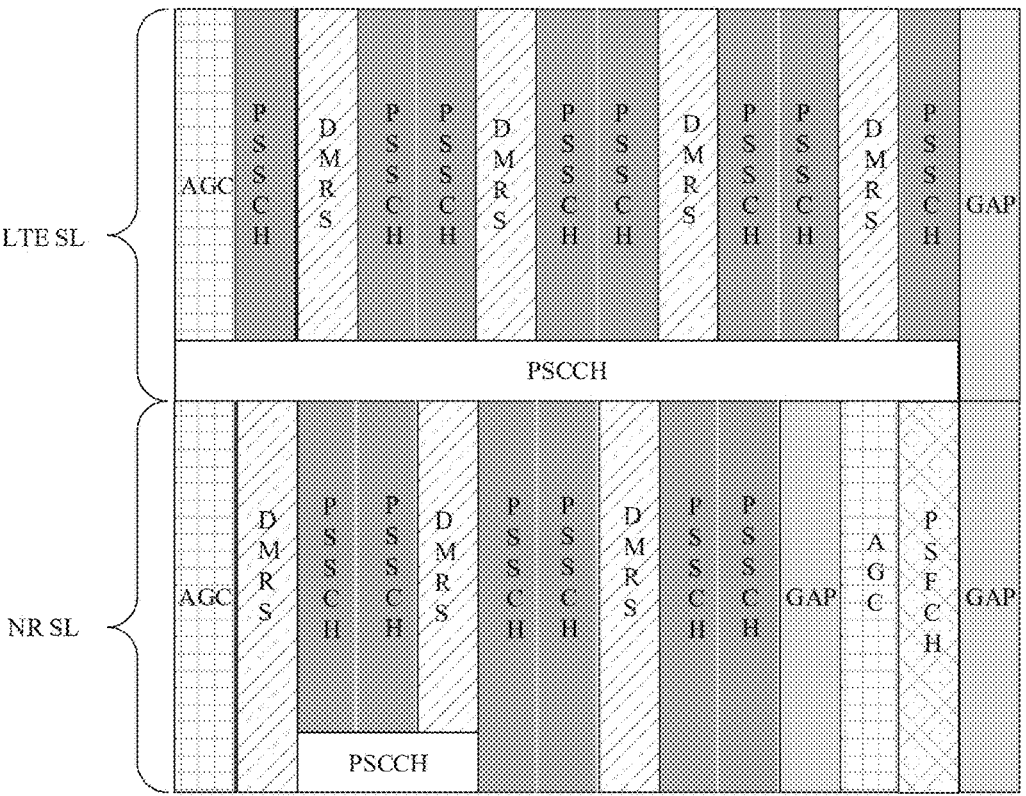
FIG. 7 is a comparison diagram of structures of slots of an LTE SL and an NR SL.

For some RATs (e.g., NR SL), retransmission of a hybrid automatic repeat request (HRAQ) may be implemented over the PSFCH. FIG. 7 is a comparison diagram illustrating structures of slots of an LTE SL and an NR SL. It can be seen that for the NR SL, PSFCHs may appear on symbol 12 and symbol 13 of the slots, and symbol 11 may be used as a gap symbol between PSSCH+PSCCH and PSFCH. As can be seen from FIG. 7, for a RAT (e.g., the NR SL) that includes a PSFCH and a RAT (e.g., the LTE SL) that does not include a PSFCH, there is a difference in configuration of automatic gain control (AGC) due to the influence of the PSFCH. In the shared resource pool, this situation may cause abnormal configuration of AGC. For example, the LTE SL will not know the logical structure of the NR SL PSFCH, resulting in incorrect configuration of AGC therein, thereby adversely affecting the performance of the LTE SL.

In some embodiments, the first RAT may be an LTE SL and the second RAT may be an NR SL. The NR SL may identify a sub-frame with LTE SL Tx and avoid PSFCH Tx in overlapped slots. In some implementations, the NR SL may disable PSFCH transmission over the shared transmission resources to mitigate the AGC problem described above. For example, in the case where a collision with an LTE SL transmission is detected, the receiver of the NR SL may discard feedback transmission over the PSFCH channel. The detection may be determined based on the first information shared by the first RAT.

It should be understood that although the AGC problem can be avoided by discarding feedback transmission, this leads to unnecessary retransmission when the ACK-NACK based feedback determines packet retransmission (unicast or groupcast), or when only NACK based feedback retransmission (distance-based groupcast) are used. That is, this would cause the NR SL to perform limited blind retransmission, possibly resulting in reduced reliability of the NR SL. Based on this, the present disclosure proposes a PSFCH transmission frame structure to realize transmission over the PSFCH.

In some embodiments, the resources required by the second RAT include transmission resources required by the PSFCH, where a period of the transmission resources required by the PSFCH is P times a period of the transmission resources required by the first RAT. P may be a positive integer. Hereinafter, a description is given using the second RAT being an NR SL and the first RAT being an LTE SL as an example.

The transmission resources required by the PSFCH may include a slot in which the PSFCH is located. The slot in which the PSFCH is located may be associated with a reference slot. The reference slot may be a start slot of the second RAT in the shared transmission resources. Using the second RAT being NR as an example, for the shared transmission resources, the terminal device is configured or pre-configured with a basic NR resource set (or a basic NR Tx resource set) defined in $\{n, n+1, \ldots, n+m\}$ slots, where $n$ may be the reference slot. The basic NR resource set includes $(n+k1)^{th}$ and $(n+k2)^{th}$ slots in each transmission period, where $k1$ and $k2$ are integers. The basic NR resource set may include resources for PSSCH+PSSCH and PSFCH transmission. The basic NR resource set is repeated periodically for every N slots from the $N^{th}$, $(N+N)^{th}$, $(N+2N)^{th}$, ..., slot. In the basic NR resource set, the PSFCH shares resources in the resource set with the PSSCH+PSSCH.

In some embodiments, specific slots for the PSFCH in the basic NR resource set may be determined based on a resource reservation interval. The resource reservation interval of the PSFCH may be indicated by a higher layer of the NR SL. In the shared resource pool, the slot occupied by the PSFCH may be overlapped in time domain with both a multiple of the period in the reserved resources of the LTE SL and the reserved resources of the NR SL. It should be noted that resources of the PSFCH transmission may be configured periodically or non-periodically. For example, the resources of the PSFCH transmission may be determined based on the DCI format or an upper layer indication.

In some embodiments, the period of the PSFCH may be an integer multiple of an LTE SL resource reservation period (i.e., the resource reservation interval). For example, the resources required by the LTE SL may be estimated based on the CBR, and a size of the resources required by the NR SL may be determined by subtracting the resources required by the LTE SL from the NR reserved resources. $P_{rsvp\_lteTX}$ represents the resource reservation interval indicated by the higher layer of the LTE SL, and the resource reservation interval $P_{rsvp\_nrTX}$ may be determined based on the size of the NR SL resources, $P_{rsvp\_nrTX}=P*P_{rsvp\_lteTX}$, where P is an integer multiple. That is, $P_{rsvp\_nrTX}$ is an integer multiple of $P_{rsvp\_lteTX}$, thus avoiding resource collisions.

$$N_{PSSCH}^{PSFCH} = L$$

may indicate that one of L slots carries the PSFCH. For example, in the case where L=4, one out of every 4 slots is a PSFCH slot.

In some embodiments, the slot in which the PSFCH is located may satisfy:

$$n + Q*P_{rsvp\_nrTX}*N_{PSSCH}^{PSFCH} - 1.$$

n may represent the location of the reference slot, $$N_{PSSCH}^{PSFCH}$$

indicates that one out of every $$N_{PSSCH}^{PSFCH}$$

slots is a PSFCH slot. Q may be a scaling factor, for example, Q may be a positive number. A cyclic set K may also be determined based on the period of the transmission resources required by the PSFCH. For example, K may satisfy $$K = \frac{P_{rsvp\_nrTX}}{TX}.$$

TX may be a basic set for transmission, i.e., K may represent the cyclic set. The basic transmit set may be understood as a minimum transmit resource. In the case where $P_{rsvp\_nrTX}$ has 50 slots and TX occupies 5 slots, then K may be 10. The above formula may then be expressed as $$n + Q*R*P_{rsvp\_nrTX}*N_{PSSCH}^{PSFCH} - 1,$$

where R may be TX.

It may be understood that in the case where the slot in which the PSFCH is located satisfies $$n + R*P_{rsvp\_nrTX}*N_{PSSCH}^{PSFCH} - 1,$$

with n as the datum, the PSFCH may occur at a period of $$R*P_{rsvp\_nrTX}*N_{PSSCH}^{PSFCH}.$$

In some embodiments, Q may be a relatively small value in the case where the sensing result of the second RAT is less than a detection threshold. For example, Q may be less than or equal to 1.

In some embodiments, Q in the above formula may be a relatively large value in the case where the RSSI result of the AGC detection is greater than the detection threshold. For example, Q may be greater than or equal to 1. For example, the location of the PSFCH slot may satisfy $$n + 2*P_{rsvp\_nrTX}*N_{PSSCH}^{PSFCH} - 1,$$

where n is the reference slot. In other words, the PSFCH slot may be repeated every $$Q*P_{rsvp\_nrTX}*N_{PSSCH}^{PSFCH}$$

based on the reference slot. That is, in the case where the sensing result of the second RAT is sufficiently high, the period for the PSFCH transmission may be increased.

It should be noted that the detection threshold may be preset and/or configured by the higher layer of the second RAT.

In some embodiments, in the case where the terminal device receiving the PSCCH/PSSCH detects that the resources of the PSCCH/PSSCH overlap with the transmission resources of the LTE, the terminal device may determine whether to transmit the PSFCH based on the traffic priority/received signal strength.

In some embodiments, the terminal device may use a set of PSFCHs periodically repeated.

In some embodiments, in the case where the HARQ-ACK is enabled, the terminal device receiving the PSCCH/PSSCH may not transmit the PSFCH over the resources that overlap with the LTE SL transmission in the time domain.

In some embodiments, the transmission resources required by the PSFCH are configured or pre-configured in the shared resource pool. For other RATs that do not contain the PSFCH, it is feasible to determine resources where the PSFCH is located based on pre-configuration or configuration, so that the AGC is prevented from being affected.

In some embodiments, a transmitting terminal device of the LET SL may interpret the PSFCH transmission using the RSSI mechanism. For example, with the help of the PSFCH on the NR, the terminal device may transmit the PSFCH with a periodicity of an integer divider (RSSI average period) of 100 ms.

In some embodiments, transmission of the LTE SL resources over the PSFCH resources may be avoided at all times. For example, the terminal device may avoid selecting resources for the PSCCH/PSSCH transmission overlapping PSFCH resources, and/or the terminal device at the transmitting end may not perform transmission of the LTE SL over resources overlapped with the PSFCCH.

In some embodiments, whether the PSFCH resources need to be transmitted may be determined based on the priorities of the first RAT and the second RAT.

In some embodiments, the shared transmission resources prohibit the PSFCH transmission. In other words, the resources required by the PSFCH may not be included in the shared transmission resources. For example, the resources for PSFCH transmission may only be in a resource pool proprietary to a corresponding RAT.

It should be noted that for NR SL proprietary resources, the terminal device may be configured to contain resources for transmitting the PSFCH feedback (only ACK-NACK or NACK) in every N slots. N is an integer. For example, the PSFCH feedback may be transmitted once every 4 or 8 slots.

Different RATs may have different subcarrier spacings (SCSs). For example, the LTE SL may have a SCS of 15 kHz, and the NR SL may have a SCS of 30 kHz. In this case, one LTE sub-frame overlaps with two NR sub-frames. This may lead to misalignment in frame boundary between the LTE SL and the NR SL, thereby causing AGC related problems. For example, the AGC problem occurs in the case where there is an LTE transmission in a sub-frame but an NR transmission is only in one slot of the sub-frame. In the case where the NR transmission is in the first slot, then after the first slot, the power at an input of the receiver of the LTE SL drops abruptly, which affects the AGC gain. Further, in the case where the NR transmission is in the second slot, the power at the input of the receiver of the LTE SL may suddenly increase at the beginning of the second slot. In addition, the LTE SL performance may be affected by the NR SL transmitted in the same sub-frame. In the case where more NR SL transmission occurs in a second half-sub-frame of the LTE SL, the received power may exceed a maximum power threshold in the case where the AGC result corresponding to the first LTE SL symbol still applies to reception in the second half-sub-frame. As a result, the LTE SL data in the second half-sub-frame may not be correctly decoded.

In view of the above problems, the present disclosure proposes the following solutions.

In some embodiments, the NR transmission is limited to sub-frames without the LTE transmission. That is, NR SL sub-frames may be separated from LTE SL sub-frames for transmission.

In some embodiments, the transmission of the NR SL spans the entire sub-frame and the transmission of the NR SL spans two or more slots. In the case where the NR SL transmission spans multiple slots, gaps at the ends of all slots except the last slot may be eliminated by repeating the last symbol of the corresponding slot, thereby avoiding power fluctuations during the transmission across the sub-frames.

In some embodiments, within carriers of the NR SL, a separate resource pool may be pre-configured to coexist with the LTE SL and communicate with the Rel-16 NR SL. With respect to resource pool isolation, a first resources pool and a second resource pool may be considered separately. In the first resources pool, the Rel-18 NR SL terminal devices can communicate with each other and coexist with the LTE SL terminal devices within carriers of the LTE SL. In the second resource pool, the Rel-18 NR SL terminal devices communicate with the Rel-16/17 NR SL terminal devices.

Figure 8:
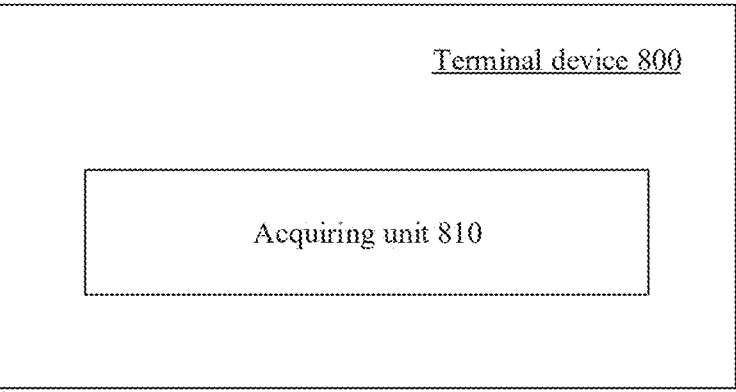
FIG. 8 is a schematic structural diagram of a terminal device according to some embodiments of the present disclosure.

FIG. 8 is a schematic structural diagram of a terminal device 800 according to some embodiments of the present disclosure. The terminal device 800 as illustrated in FIG. 8 may include a first RAT and a second RAT. The terminal device 800 may include an acquiring unit 810.

The acquiring unit 810 is configured to acquire, by the second RAT, first information shared by the first RAT, where the first information indicates information related to first resources of the first RAT, and both the first RAT and the second RAT are RATs based on a sidelink. In some embodiments, the information related to the first resources includes sensing information and/or resource information.

In some embodiments, the resource information includes one or more of the following information of the first RAT: information related to reserved resources of the terminal device; information related to reserved resources determined by decoding sidelink control information SCI; sub-channel configuration information; a candidate resource set; information related to logical sub-frames; priority information; or information related to a transmission resource.

In some embodiments, the sensing information indicates a sensing result, where the sensing result includes one or more of the following parameters obtained by sensing signals and/or channels of the first RAT: reference signal received power RSRP, reference signal received quality RSRQ, and received signal strength indicator RSSI.

In some embodiments, the terminal device 800 further includes a transmitting unit configured to transmit, by the second RAT, a first request message, and the acquiring unit is configured to receive, by the second RAT, the first information in response to transmitting the first request message.

In some embodiments, the terminal device 800 further includes a sharing unit. The sharing unit is configured to share, by the first RAT, the first information based on one or more of time, message and pre-configuration.

In some embodiments, the acquiring unit is configured to perform one or more of: periodically acquiring, by the second RAT, the first information shared by the first RAT; acquiring, by the second RAT, the first information shared by the first RAT in response to a traffic trigger condition of the second RAT; or acquiring, by the second RAT, the first information shared by the first RAT in response to a sensing result of the first RAT being less than or equal to a first threshold.

In some embodiments, the first threshold is predefined and/or configured by a higher layer.

In some embodiments, the terminal device 800 is further configured to, in a slot n, provide a high-layer parameter for transmission over a PSSCH and/or a PSCCH; and the acquiring unit is configured to: acquire, by the second RAT, the first information within T milliseconds prior to the slot n, and determine transmission resources of the second RAT based on the first information; or acquire, by the second RAT, the first information within a first time window, and determine transmission resources of the second RAT based on the first information. T is less than or equal to $T_{max}$, $T_{max}$ being a positive integer.

In some embodiments, the first information indicates transmission resources required by the first RAT in shared transmission resources. The shared transmission resources are shared by the first RAT and the second RAT.

In some embodiments, a proportion of the transmission resources required by the first RAT in the shared transmission resources is configured or predefined.

In some embodiments, the terminal device 800 is further configured to perform one or more of: in response to the first RAT and the second RAT both needing to use the shared transmission resources, preferentially allocating resources to a RAT having a greater sensing result; in response to a target RAT of the first RAT and the second RAT needing to use the shared transmission resources, allocating a part of the shared transmission resources to the target RAT; or in response to a target RAT of the first RAT and the second RAT needing to use the shared transmission resources, reserving a part of the shared transmission resources to an RAT other than the target RAT.

In some embodiments, the transmission resources required by the first RAT are determined by a channel busy ratio CBR, where a CBR corresponding to a sub-frame n satisfies:

$$CBR_n = k1 * \frac{\sum_{i=1}^{M} Q_{n-i}}{M} + k2 * Q_{n-1} + k3 * (Q_{n-1} - Q_{n-2}),$$

where k1, k2, and k3 are each a number greater than 0 and less than 1, M represents a number of sub-frames determining the $CBR_n$, and Q represents a sensing result of a corresponding sub-frame.

In some embodiments, the transmission resources required by the first RAT are determined by channel resources CRs. The CRs are determined based on a CBR, and the CRs are configured to determine a size of the transmission resources required by the first RAT and/or the second RAT2 in the shared transmission resources.

In some embodiments, the terminal device is further configured to perform one or more of: preferentially allocating and/or assigning resources in the shared transmission resources to a RAT with a higher RAT priority; preferentially allocating and/or assigning resources in the shared transmission resources to traffic with a higher traffic priority; or preferentially allocating and/or assigning resources in the shared transmission resources to a RAT with a physical sidelink feedback channel PSFCH.

In some embodiments, the resources required by the second RAT include transmission resources required by the PSFCH. A period of the transmission resources required by the PSFCH is P times a period of the transmission resources required by the first RAT, P being a positive integer.

In some embodiments, the transmission resources required by the PSFCH include a slot where the PSFCH is located. The slot where the PSFCH is located is related to a reference slot, the reference slot being a start slot of the second RAT in the shared transmission resources.

In some embodiments, the slot where the PSFCH is located satisfies:

$$n + Q * P_{rsvp\_nrTX} * N_{PSSCH}^{PSFCH} - 1,$$

where n represents a location of the reference slot, Q represents a scaling factor and is a positive number, $P_{rsvp\_nrTX}$ represents the period of the transmission resources required by the PSFCH, and $$N_{PSSCH}^{PSFCH}$$

represents that one out or every $$N_{PSSCH}^{PSFCH}$$

slots is a PSFCH.

In some embodiments, in response to a sensing result of the second RAT being greater than or equal to a detection threshold, R is an integer greater than or equal to 2.

In some embodiments, the detection threshold is predefined and/or defined by a higher layer of the second RAT.

In some embodiments, the resources required by the second RAT include transmission resources required by the PSFCH. Locations of the transmission resources required by the PSFCH in the shared transmission resources are pre-configured.

In some embodiments, the resources required by the second RAT include transmission resources required by the PSFCH, and transmission over the PSFCH is prohibited in the shared transmission resources.

Figure 9:
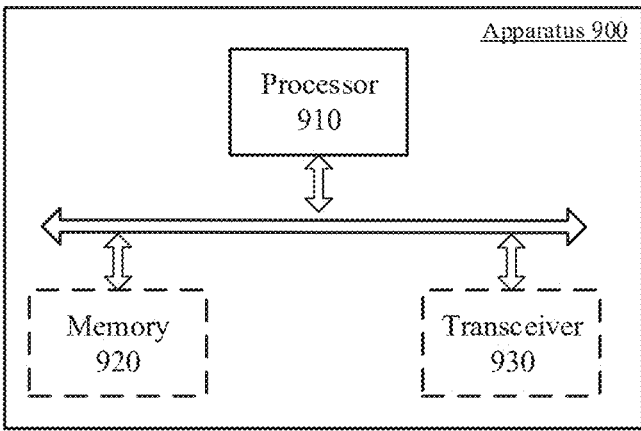
FIG. 9 is a schematic structural diagram of a communication apparatus according to some embodiments of the present disclosure.

FIG. 9 is a schematic structural diagram of a communication apparatus 900 according to some embodiments of the present disclosure. The dotted lines in FIG. 9 indicate that the unit or module is optional. The communication apparatus 900 in FIG. 9 may be employed to perform the method according to the above method embodiments. The communication apparatus 900 may be a chip, a terminal device, or a network device.

The communication apparatus 900 may include one or more processors 910. The processor 910 may support implementation of the method according to the above method embodiments by the communication apparatus 900. The processor 910 may be a general purpose processor or an application-specific processor. For example, the processor may be a central processing unit (CPU). The processor may be a general processor, a digital signal processor (DSP), an application specific integrated circuit (ASIC), a field programmable gate array (FPGA) or another programmable logic device, a discrete gate or transistor logic device, or a discrete hardware component, or the like. The general-purpose processor may be a microprocessor or any customary processor or the like.

The communication apparatus 900 may further include one or more memories 920. The memory 920 has stored thereon a program that is executable by the processor 910 to cause the processor 910 to perform the method described in the above method embodiments. The memory 920 may be separate from the processor 910 or integrated within the processor 910.

The communication apparatus 900 may also include a transceiver 930. The processor 910 may communicate with other devices or chips by the transceiver 930. For example, the processor 910 may communicate (transmit and receive) data with other devices or chips by the transceiver 930.

Some embodiments of the present disclosure further provide a computer-readable storage medium configured to store one or more programs. The computer-readable storage medium may be applied to a terminal device or a network device according to the embodiments of the present disclosure, and the one or more programs cause a computer to perform the method performed by the terminal device or the network device according to the respective embodiments of the present disclosure.

Some embodiments of the present disclosure further provide a computer program product. The computer program product includes one or more programs. The computer program product may be applied to a terminal device or a network device according to the embodiments of the present disclosure, and the one or more programs cause a computer to perform the method performed by the terminal device or the network device according to the respective embodiments of the present disclosure.

Some embodiments of the present disclosure further provide a computer program. The computer program may be applied to a terminal device or a network device according to the embodiments of the present disclosure, and the program causes a computer to perform the method performed by the terminal device or the network device according to the respective embodiments of the present disclosure.

It should be understood that the terms "system" and "network" in the specification are generally exchanged. Further, the terms used herein are for the purpose of describing particular embodiments only and are not intended to limit the present disclosure. The terms such as "first," "second," "third," "fourth," and the like in the specifications, claims and the accompanying drawings of the present disclosure are intended to distinguishing different objects but are not intended to define a specific sequence. In addition, terms "comprise," "include," and variations thereof are intended to define a non-exclusive meaning.

In the embodiments of the present disclosure, "an indication" mentioned in the specification may be a direct indication, an indirect indication, or an association. By way of example, A indicates B, which can mean that A directly indicates B, e.g., B can be obtained by A; can also indicate that A indicates B indirectly, for example A indicates C, and B can be obtained by C; it can also be shown that there is an association between A and B.

In the embodiments of the present disclosure, "B corresponding to A" means that B is associated with A, from which B may be determined. However, it should also be understood that determining B from A does not mean determining B from A alone, and B may also be determined from A and/or other information.

In the embodiments of the present disclosure, the term "correspond" or derivatives thereof mean that there is a direct correspondence or an indirect correspondence between the two, that there is a correlation between the two, and that there is a relationship between indicating and being indicated, configuring and being configured, or the like.

In embodiments of the present disclosure, "predefined" or "pre-configured" may be implemented by pre-storing a corresponding code, table, or other means that may be used to indicate relevant information in a device (e.g., including a terminal device and a network device), and the present disclosure does not limit the specific implementation thereof. For example, the term "predefined" may refer to "defined in the protocol."

In embodiments of the present disclosure, the term "protocol" may refer to a standard protocol in the field of communications, and may include, for example, the LTE protocol, the NR protocol, and related protocols used in future communication systems, without limitation.

In the description of the embodiments of the present disclosure, the term "and/or" is merely an association relationship for describing associated objects, which represents that there may exist three types of relationships, for example, A and/or B may represent three situations: only A exists, both A and B exist, and only B exists. In addition, the forward-slash symbol "/" generally represents an "or" relationship between associated objects before and after the symbol.

It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

In the several embodiments provided in the present disclosure, it should be understood that the disclosed system, apparatus and method may be practiced in other manners. The above described device embodiments are merely illustrative. For example, the unit division is merely logical function division and may be other divisions in actual practice. For example, multiple units or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same location or may be distributed into a plurality of network units. Some of or all of the units may be selected according to actual needs to achieve the objectives of the solutions of the embodiments.

In addition, functional units in the embodiments of the present disclosure may be integrated into one processing unit, or each of the units may exist along physically, or two or more units may be integrated into one unit.

In the above embodiments, the technical solutions may be totally or partially practiced by software, hardware, firmware or any combination thereof. During practice by software, the technical solutions may be totally or partially implemented in the form of a computer program product. The computer program product includes one or a plurality of computer-executable instructions. The computer program instructions, when loaded and executed on a computer, may cause the computer to totally or partially perform the procedures or functions in the embodiments of the present disclosure. The computer may be a general computer, a dedicated computer, a computer network, or another programming device. The computer-executable instructions may be stored in a computer-readable storage medium, or transferred from one computer-readable storage medium to another. For example, the computer-executable instructions may be transmitted from one website, computer, server or data center to another in a wired fashion, for example, a coaxial cable, an optical fiber, a digital subscriber line (DSL) or a wireless fashion, for example, an infrared ray, a radio, a microwave or the like. The computer-readable storage medium may be any available medium that is accessible or a data storage device such as a server, a data center or the like integrated with one or a plurality of available media. The available medium may be a magnetic medium, for example, a floppy disk, a hard disk or a magnetic tape, an optical medium, for example, a digital versatile disc (DVD), or a semiconductor medium, for example, a solid state disk (SSD) or the like.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A method for communication, comprising:
acquiring, by a terminal device, first information of a first radio access technology (RAT), wherein the first information indicates information related to a first resources of the first RAT, and each of the first RAT and a second RAT is an RAT used to transmit a sidelink, and wherein the first information is acquired at a first time duration prior to a slot n, wherein the slot n is used to transmit on at least one of a physical sidelink shared channel (PSSCH) or a physical sidelink control channel (PSCCH) by using the second RAT based on the first information, and wherein acquiring the first information comprises at least one or more of:
periodically acquiring the first information;
acquiring the first information in response to a traffic trigger condition of the second RAT; or
acquiring the first information in response to a comparison result between a sensing result of the first RAT and a first threshold,
wherein the first threshold is preset or configured by a higher layer, and
transmitting the sidelink on at least one of the first RAT or the second RAT.

2. The method of claim 1, wherein the first time duration is 4 milliseconds or 8 milliseconds.

3. The method according to claim 1, wherein the information related to the first resources includes at least one of sensing information and resource information.

4. The method according to claim 3, wherein the resource information includes one or more of following information of the first RAT:

information related to reserved resources of the terminal device;
information related to reserved resources indicated by sidelink control information (SCI);
sub-channel configuration information;
a candidate resource set;
information related to logical sub-frames;
priority information; or
information related to transmission resources.

5. The method according to claim 3, wherein the sensing information indicates a sensing result, wherein the sensing result includes one or more of following parameters of the first RAT: reference signal received power (RSRP), reference signal received quality (RSRQ), or received signal strength indicator (RSSI).

6. The method according to claim 1, further comprising:
transmitting a first request message over the second RAT;
wherein receiving the first information comprises:
receiving the first information in response to transmitting the first request message.

7. The method according to claim 1, wherein the first information indicates transmission resources in shared transmission resources that are shared by the first RAT and the second RAT.

8. The method according to claim 7, wherein a proportion of the transmission resources in the shared transmission resources is configured or predefined.

9. The method according to claim 7, further comprising one or more of:
in response to the first RAT and the second RAT both needing to use the shared transmission resources, preferentially allocating resources to a RAT having a greater sensing result;
in response to a target RAT of the first RAT and the second RAT needing to use the shared transmission resources, allocating a part of the shared transmission resources to the target RAT; or
in response to a target RAT of the first RAT and the second RAT needing to use the shared transmission resources, reserving a part of the shared transmission resources to an RAT other than the target RAT.

10. The method according to claim 7, wherein the transmission resources are determined by a channel busy ratio (CBR), wherein $CBR_n$ represents a CBR corresponding to a sub-frame n, and $CBR_n$ satisfies:

$$CBR_n = k1 * \frac{\sum_{i=1}^{M} Q_{n-i}}{M} + -k2 * Q_{n-1} + k3 * (Q_{n-1} - Q_{n-2});$$

wherein k1, k2, and k3 are each a number greater than 0 and less than 1, M represents a number of sub-frames for determining the $CBR_n$, and Q represents a sensing result of a corresponding sub-frame.

11. The method according to claim 7, wherein the transmission resources are determined by channel resources (CRs), wherein the CRs are determined based on a channel busy ratio (CBR), and the CRs are configured to determine a size of the transmission resources required by one or both of the first RAT and the second RAT in the shared transmission resources.

12. The method according to claim 7, further comprising one or more of:
preferentially allocating or assigning resources in the shared transmission resources to a RAT with a higher RAT priority;

preferentially allocating or assigning resources in the shared transmission resources to traffic with a higher traffic priority; or preferentially allocating or assigning resources in the shared transmission resources to a RAT with a physical sidelink feedback channel (PSFCH).

13. The method according to claim 12, wherein resources required by the second RAT include transmission resources required by the PSFCH, wherein a period of the transmission resources required by the PSFCH is P times a period of the transmission resources required by the first RAT, P being a positive integer.

14. The method according to claim 13, wherein the transmission resources required by the PSFCH include a slot where the PSFCH is located, wherein the slot where the PSFCH is located is related to a reference slot, the reference slot being a start slot of the second RAT in the shared transmission resources.

15. The method according to claim 14, wherein the slot where the PSFCH is located satisfies:

$$n + Q * P_{rsvp\_nrTX} * N_{PSSCH}^{PSFCH} - 1,$$

wherein n represents a location of the reference slot, Q represents a scaling factor and is a positive number, $P_{rsvp\_nrTX}$ represents the period of the transmission resources required by the PSFCH, and $$N_{PSSCH}^{PSFCH}$$

represents that one out of every $$N_{PSSCH}^{PSFCH}$$

slots is a PSFCH.

16. The method according to claim 12, wherein resources required by the second RAT include transmission resources required by the PSFCH, wherein locations of the transmission resources required by the PSFCH in the shared transmission resources are pre-configured.

17. A terminal device, comprising:
at least one processor;
one or more non-transitory computer-readable storage media coupled to the at least one processor and storing programming instructions for execution by the at least one processor, wherein the programming instructions, when executed, cause the terminal device to perform operations comprising:

acquiring first information of a first RAT, wherein the first information indicates information related to a first resources of the first RAT, and each of the first RAT and a second RAT is an RAT used to transmit a sidelink, and wherein the first information is acquired at a first time duration prior to a slot n, wherein the slot n is used to transmit on at least one of a physical sidelink shared channel (PSSCH) or a physical sidelink control channel (PSCCH) by using the second RAT based on the first information, and wherein acquiring the first information comprises at least one or more of:

periodically acquiring the first information;

acquiring the first information in response to a traffic trigger condition of the second RAT; or acquiring the first information in response to a comparison result between a sensing result of the first RAT and a first threshold, wherein the first threshold is preset or configured by a higher layer.

18. The terminal device of claim 17, wherein the first time duration is 4 milliseconds or 8 milliseconds.

19. The terminal device of claim 17, wherein the information related to the first resources includes at least one of sensing information and resource information.

20. One or more non-transitory computer-readable media storing computer instructions, that when executed by one or more processors, cause a computing device to perform operations comprising:

acquiring first information of a first radio access technology (RAT), wherein the first information indicates information related to a first resources of the first RAT, and each of the first RAT and a second RAT is an RAT used to transmit a sidelink, and wherein the first information is acquired at a first time duration prior to a slot n, wherein the slot n is used to transmit on at least one of a physical sidelink shared channel (PSSCH) or a physical sidelink control channel (PSCCH) by using the second RAT based on the first information, and wherein acquiring the first information comprises at least one or more of:

periodically acquiring the first information;

acquiring the first information in response to a traffic trigger condition of the second RAT; or acquiring the first information in response to a comparison result between a sensing result of the first RAT and a first threshold, wherein the first threshold is preset or configured by a higher layer.

\* \* \* \* \*